MECHANISM FOR DRIVING THE HEAD-SUPPORTING BODY
IN THE MAGNETIC SOUND RECORDING
AND READING MACHINE

Filed June 11, 1958 3 Sheets-Sheet 1

March 22, 1960 YASUSHI HOSHINO ET AL 2,929,633

MECHANISM FOR DRIVING THE HEAD-SUPPORTING BODY IN THE MAGNETIC SOUND RECORDING AND READING MACHINE

Filed June 11, 1958 3 Sheets-Sheet 2

March 22, 1960 YASUSHI HOSHINO ET AL 2,929,633

MECHANISM FOR DRIVING THE HEAD-SUPPORTING BODY IN THE MAGNETIC SOUND RECORDING AND READING MACHINE

Filed June 11, 1958 3 Sheets-Sheet 3

United States Patent Office 2,929,633

Patented Mar. 22, 1960

2,929,633

MECHANISM FOR DRIVING THE HEAD-SUPPORTING BODY IN THE MAGNETIC SOUND RECORDING AND READING MACHINE

Yasushi Hoshino and Minoru Sato, Tokyo, Japan

Application June 11, 1958, Serial No. 741,368

Claims priority, application Japan June 17, 1957

6 Claims. (Cl. 274—4)

This invention relates to a mechanism for driving a turntable or a rotary body supporting a group of heads in the magnetic sound recording and reading machine. Further, it relates to a mechanism for accurately returning the head-supporting body involving the turntable or heads, a shiftable plate and other attached devices to the starting point in relation to the magnetic sound recording sheet.

According to the invention, the turntable or rotary body can be returned to and stopped at the point where the recording or reproduction is started, the return movement being effected first at high speed and then at low speed in the proximity of the starting point, and the head can be finely adjusted at any time when the head is not running accurately on the sound track due to elongation or shrinkage of the sheet.

In order that the invention may be clearly understood, some embodiments thereof will now be described in detail with reference to the accompanying drawings in which.

As to the magnetic sound recording sheet, a full and detailed description has been given in U.S. patent application No. 635,335. For better understanding of the mechanism of the invention, the magnetic sound recording sheet will be briefly explained hereunder.

Figures 1, 2, 3, 4, 7:
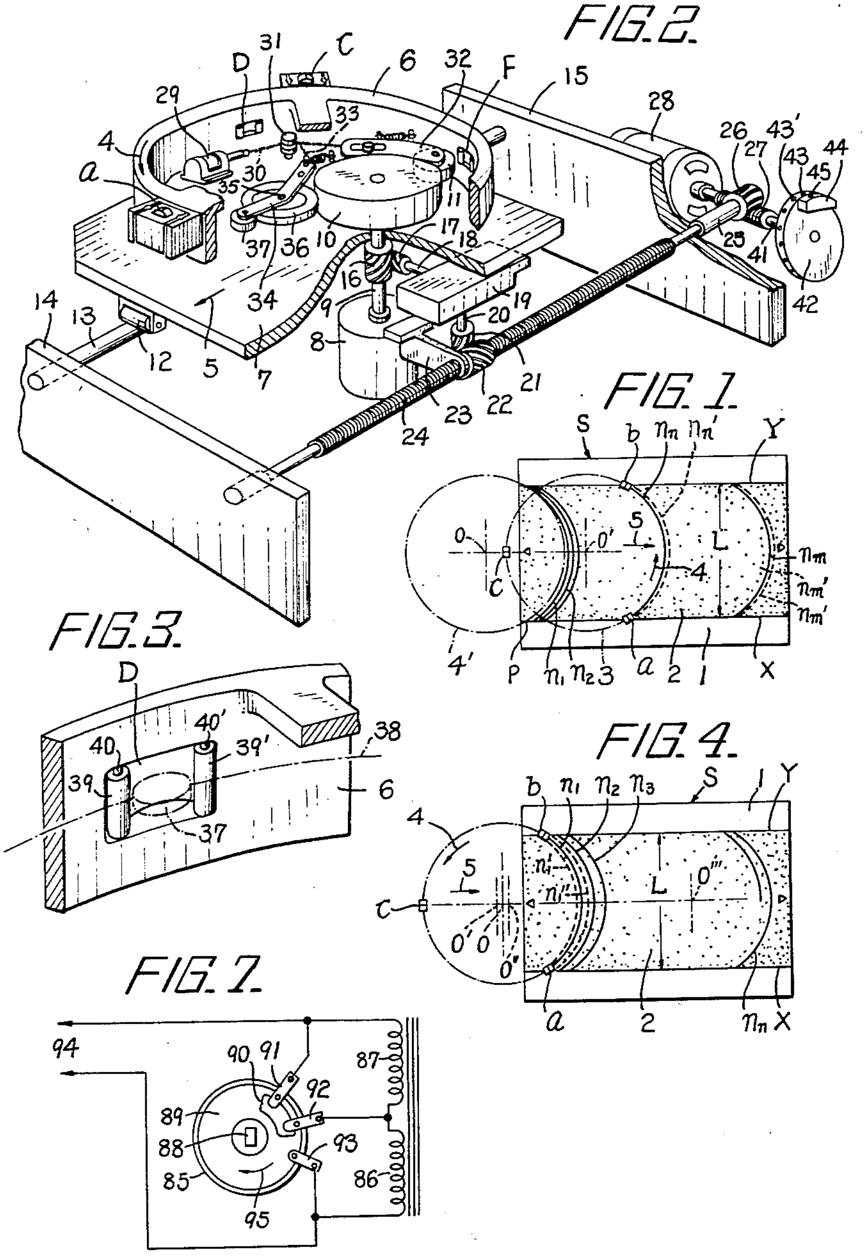
Fig. 1 is a plan of a magnetic sound recording sheet showing the relation of the same with the head.
Fig. 2 is a perspective view showing the essential elements of the magnetic sound recording and reading machine.
Fig. 3 is a perspective view showing a detail of the turntable.
Fig. 4 is a plan of a magnetic sound recording sheet showing the relation of the same with the turntable.
Fig. 7 is a plan showing one example of the electromagnet to be used for the operation adjustment.
Figures 6, 8, 10:
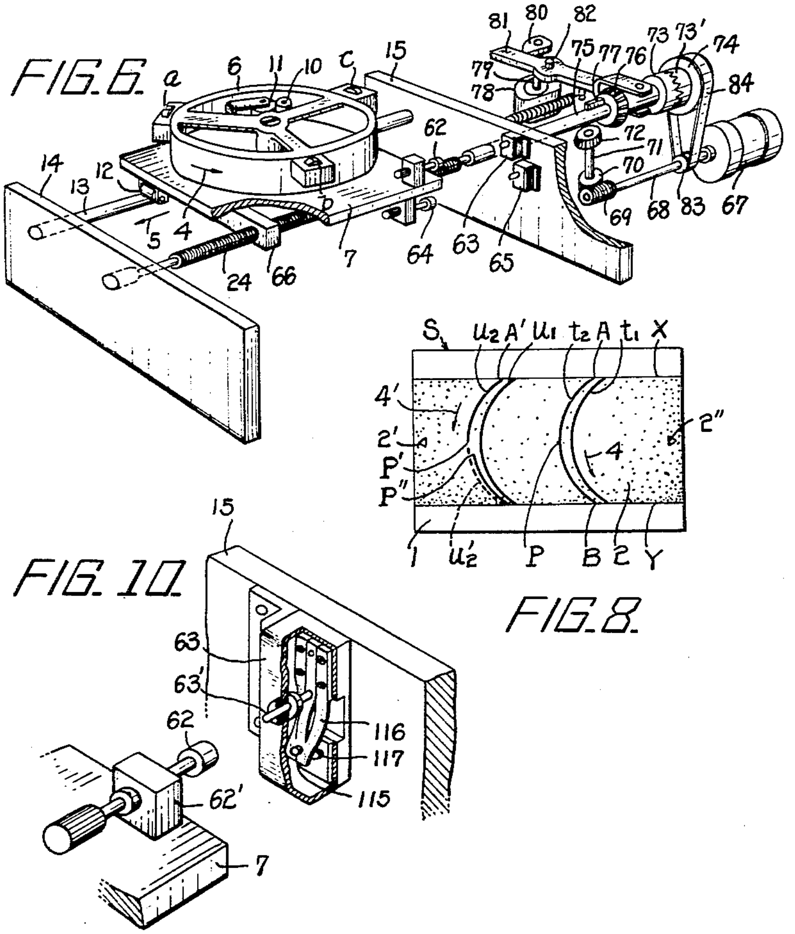
Fig. 6 is a similar view of the details showing another example.
Fig. 8 is a plan of the magnetic sound recording sheet.
Figs. 10 and 11 are a perspective and a plan view showing details of a part of the machine shown in Fig. 9.

In Figs. 1, 4 and 8, 1 denotes a paper. Descriptions and/or drawings may be or are applied on the back of the paper 1. A magnetic sound recording film 2 is pasted or coated uniformly on the paper 1 between the parallel lines X, Y. The positions of three recording or reproducing heads are indicated with *a*, *b*, and *c*. These heads fixed on a turntable or a rotary body having the center O′ are positioned equidistantly on the circumference. Producing the same locus 3, each head is rotated in the direction of an arrow 4 while at the same time the center O′ is moved in the direction of an arrow 5. Assuming that sound current flows in each head and the head gap is in contact with the magnetic sound recording film 2 (the distance between *a*—*b*, *b*—*c* and *c*—*a* is equal to the width L of the film 2) whereby sound tracks $n_1, n_2 \ldots n_n$ are produced on the film 2 by rotation of the heads started from the center O′, the reproduction can be well achieved when the heads are started to rotate again from the center O and any head scans the sound tracks $n_1, n_2 \ldots n_n$. It however occurs often that the sound recording and thus the sound tracks $n_1, n_2 \ldots n_n$ are produced at the time of dry season and the sound reproduction is made at wet time, i.e. in the condition that the sheet is elongated due to the moisture. In the reproduction of such expanded sheet, the initial locus 4′ of the scanning is adjusted to be on the track $n_1$ whereby the sound reproduction may take place satisfactorily at the beginning but gradually become worse, since the scanning locus of the head runs on the track $n_n$ which is not in the correct coincidence with the track $n_{n'}$ where the track $n_n$ is now shifted. This difficulty can be surmounted by the relative movement of the scanning locus of the head and the sound recording sheet S so as to effect the exact coincidence the scanning locus and the sound track.

In Fig. 2 showing an embodiment of the machine, 6 is a turntable provided on its circumference with three heads *a*, *b* (not shown) and *c* arranged equidistantly. 7 is a shiftable plate supported on a bearing (not shown) situated in the center of the turntable 6 and rotatable in the direction of the arrow 4. A motor 8 drives a flywheel 10 connected to the shaft 9 of the motor. The rotation of the wheel 10 is transmitted to a rubber idler 11 which in turn comes into contact with the inner surface of the turntable 6 thereby to rotate it. Rollers 12 are rotatably secured to the plate 7 and slide on a rail 13 supported on end plates 14, 15.

The mechanism for shifting the turntable in the direction of the arrow 5 will now be explained. The rotation of the motor 8 is transmitted through a worm gearing 16, 17 to a shaft 18 and then to a reduction device 19 integral with the shiftable plate 7 and thus a worm gearing 21, 22 is rotated through a shaft 20. The wheel 22 is rotatably mounted on a metal fitting 23 fixed on the plate 7. A helical screw 24 is not rotated in connection with a worm gearing 26, 27, that is, the screw 24 remains in its fixed state so long as a motor 28 stands still, since the worm gear 27 fitted on a shaft 41 of the motor 28 is engaged with the worm gear 26 fitted on a shaft 25 of the helical screw 24 but the rotation is not transmitted from the shaft 25 to the gearing 26, 27. With the motor 8 set in motion, the wheel 22 is rotated through the shaft 9 and the mechanism 16, 17, 18, 19, 20, 21. As the wheel 22 is adapted to be functioning as a nut against, and engaged with, the helical screw 24 without causing it to rotate, the metal fitting 23 moves slowly to the left if the rotating direction of the wheel 22 is properly selected, thus causing the plate 7 to move in the direction of the arrow 5.

In this way the turn table 6 is shifted at low speed in the direction of the arrow 5 while rotating in the direction of the arrow 4, whereby the scanning motion of the heads is accomplished in carrying out the sound recording and reproduction as desired. For reproduction after the sound recording is completed, if it is desired to return the heads quickly from the center O′ to the center O of its rotation as shown in Fig. 1, the shaft 25 and thus the helical screw 24 is driven at a high rate by the motor 28, thereby shifting the plate 7 swiftly from the left to the right, since the wheel 22 is connected to the wheel 21, the reduction device 19, the worm gearing 16, 17 and the motor 8 in the stationary condition while the plate 7 is fixed to the fitting 23 associated with the wheel 22. When the heads return to the center O of the rotation, perfect reproduction is effected if any of the heads are arranged to start from the predeteremined position, for instance, the point P, of the track $n_1$ (Fig. 1) at the time of reproduction.

The mechanism for returning the heads to said starting point will be described with reference to Fig. 2.

In Fig. 2, 29 is an electromagnet fixed on the shiftable plate 7. In operation, the electromagnet 29 is electrically charged whereby a chain 30 is drawn towards the electromagnet to pull a metal fitting 32 leftwards through a pulley 31 so that the idler 11 is detached from the fly wheel 10 thereby causing the turn table 6 to rotate more smoothly. At the same time a chain 33 pulls a metal fitting 34. As this fitting has its fulcrum 35, a rubber idler 36 comes into contact with the fly wheel 10 and thereby rotates to turn a rubber roller 37 associated with the idler 36. The rubber roller 37 is usually kept at a distance with the turn table 6. When the electromagnet 29 pulls the chain 33, the idler 37 comes into contact with the inner surface of the turn table 6 to turn it. The locus produced by the roller 37 on the turn table 6 is shown with a broken line 38 in Fig. 3. Along this broken line there are provided three recesses D, E (not shown) and F. In Fig. 3 showing one example of said recesses, the reces D has a little greater radius of curvature than the diameter of the rubber roller 37. On both sides of the recess D rollers 39, 39' are rotatably mounted on shafts 40, 40' fixed on the turn table 6. To carry out the quick return of the shiftable plate 7 by the motor 28, the rubber idler 11 is separated from the fly wheel 10 under the action of the electromagnet 29 to bring the turn table 6 into its free rotation and to make the rubber roller 37 contact with the inner surface of the turn table 6. When the roller 37 falls into one of the recesses D, E, F, the turn table is ceased to rotate, continuing the return movement in the direction opposite to the direction of the arrow 5. If the reproducing head is then arranged to be in the starting position P (Fig. 1) when the rubber roller 37 falls in one of the recesses D, E, F, the satisfactory reproduction is effected.

In the magnetic sound recording and reading machine having the mechanism as described above, there is further provided a means for correcting the deviation of the tracks as shown in Fig. 1 where a track $n_n$ is shifted to $n_{n'}$ due to elongation of the sheet. By the working of the mechanism shown in Fig. 2, the motor 28 and thus the helical screw 24 is stopped while in reproduction. A wheel 42 fixed on the shaft 41 of the motor 28 is rotated by hand thereby to rotate the shaft 25 so as to set the scanning locus $n_n$ on the track $n_{n'}$. Such manual regulation of the wheel 42 may be easily done while listening to the reproduced sound and it may be more readily carried out if some indications 43, 43'—marked at regular intervals on the wheel 42 are arranged to coincide, by eye-measurement, with an indication 45 marked on a metal fitting 44 fixed integrally to the end plate 15 (of which the fixed part is not shown).

In Fig. 1, $n_m$ is a track formed in the advanced stage of recording and the deviation between the scanning locus and the recording track or between $n_m$ and $n_{m'}$ is much larger that between $n_n$ and $n_{n'}$. However, good reproduction will be attained if the wheel 42 is rotated at a constant rate during the advance of the head from the starting track $n_1$ to the last track $n_m$. In fact, the width between the magnetic sound recording tracks is relatively wide, e.g. about 0.9 mm., so that all tracks will be fairly well reproduced by adjusting the wheel 42 once or twice during the reproducing operation over the whole tracks. The perfect reproduction can be attained by such arrangement that the wheel 22 is rotated at a suitably reduced speed while the wheel 42 is rotated at a constant rate. The wheels 22, 42 may be rotated through a speed change gear by which the rotation ratio of the wheel 22 to the wheel 42 is changed in proportion to the elongation or shrinkage of the sheet S between the recording time and the reproduction time, or may be so arranged with the elongation or shrinkage of the sheet S, the rotation of the wheel 42 is changed over to that in the opposite direction. Such mechanism however is already known and therefore needs no further description.

Figure 5:
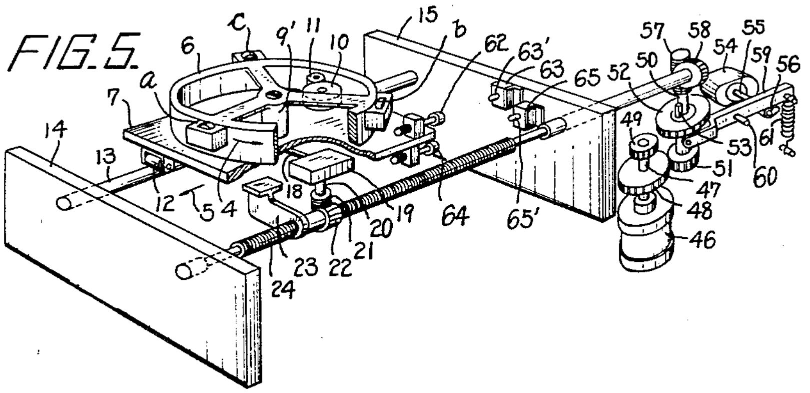
Fig. 5 is a perspective view of the magnetic sound recording and reading machine showing one example of the means for causing quick return movement of the turntable.

Figs. 5 and 6 illustrate another embodiment of the mechanism for quick return of the turn table in the magnectic sound recording and reading machine.

As described in conjunction with Fig. 4, for carrying out reproduction after the completion of recording the turn table must be moved in the opposite direction of the arrow 5 by the motor to return to the starting point O. For the purpose it is necessary to stop the center of the turn table at the exact position O. If the stop is made inaccurately, e.g. at O' or O'', the scanning locus of the head will be $n_{1'}$ or $n_{1''}$ deviated from the correct track $n_1$, from which good sound reproduction cannot be expected.

In Fig. 4, the sound recording is started from $n_1$ and ended at $n_n$ near the end of the magnetic sound recording sheet, and the rotation center of the head lies at O'''. For reproduction, the turn table must be moved back from the position O''' to the position O as quickly as possible. If this return is effected at high speed by the motor, it is difficult to achieve the end because of inertia of the heavy turn table. It is thus natural that the turn table is stopped at an inaccurate position such as O' or O''.

The invention eliminates such defects and produces advantage that the turn table moves back quickly and stops exactly at O.

In Fig. 5, a shaft 10 of the motor (not shown) provided under the shiftable plate 7 drives a rubber idler 11 which is in contact with the inner surface of the turn table 6, so that the turn table 6 is rotated at a constant speed in the direction of the arrow 4.

Description of the contact of the head with the magnetic sound recording sheet is omitted since it is unessential to the present invention.

The turn table 6 is rotatably mounted on a bearing 9' fixed on the shiftable plate 7. The mechanism for shifting the plate 7 in the direction of the arrow 5 or the opposite direction will be described as under. 12 is a pulley rotatably fixed to the plate 7 and 13 a guide rail supported on the end plates 14, 15, on which the plate 7 may be moved. The helical screw 24 for shifting the plate 7 is supported at one end by the end plate 14 and adapted to be rotated at the other end by a motor 46. A shaft 47 of the motor is provided with a large gear wheel 48 and a small gear wheel 49, while a shaft 50 has gear wheels 51, 52 formed in one body having a key hole into which a key 53 fixed on the shaft 50 is fitted. The wheels 51, 52 are thus slidable in the axial direction.

A cam 56 fixed on a rotary shaft 55 of the electromagnet 54 (shown as a rotary magnet) is situated as shown when the electromagnet 54 is not charged with electricity. The shaft 50 is rotated by the wheel 51 in engagement with the wheel 48, thereby rotating the helical screw 24 through a worm gearing 57, 58. With the electromagnet 54 charged, the shaft 55 and the cam 56 rotate counterclockwise at an angle, thereby to push a lever 59 upwards and the wheels 51, 52 downwards through a fulcrum 60 and consequently the wheel 49 comes to engage with the wheel 52 while the wheel 48 disengages with the wheel 51. When the electromagnet 54 is cut off the current, the engagement of the wheels 48, 51 is automatically formed by a spring 61. Thus, it indicates that when the electromagnet is not charged, the wheel 48 having a large diameter engages with the wheel 51 to rotate the helical screw 24 at high speed, but when the electromagnet is charged, the wheel 49 of a small diameter engages with the wheel 52 of a large diameter to rotate the helical screw 24 at a constant speed.

A metal fitting 23 is fixed to the plate 7 and a gear wheel 22 is rotatably mounted on said fitting 23. The rotation of a shaft 18 driven by the motor (not shown) having the shaft 10 is reduced by a reduction device 19 and transmitted through a shaft 20 to the wheel 21 engaging with the wheel 22.

In the mechanism for shifting the plate 7 at the time of reproduction (reading), the motor 46 and the helical screw 24 are ceased to move and the wheel 21 is slowly driven through the reduction device 19 by the motor having the shaft 10 and rotates the wheel 22 of which the inner surface functions as a nut for engaging with the helical screw, so that the shiftable plate 7 can slowly move in the direction of the arrow 5 while at the same time the turn table 6 is rotated in the direction of the arrow 4 by the rotation of the shaft 10 and the idler 11. Thus, the reproduction (reading) can be effected in the magnetic sound recording and reading machine.

When the reproduction is over and the turn table 6 or the shiftable plate 7 is brought back quickly to the starting position, i.e. to the right, the motor having the shaft 10 is stopped. The motor 46 is set in motion without electrically connecting the electromagnet 54. The helical screw 24 is then rotated at high speed so that the turn table moves swiftly from the left to the right. When a contact 62 fixed on the plate 7 comes into touch with a contact 63′ of the microswitch 63, the electric circuit of the magnet 54 is formed through the microswitch 63 whereby the helical screw 24 is turned to a low speed rotation and the plate 7 is slowly moved. When the plate 7 reaches a position where it should be stopped, a contact 64 fixed to the plate 7 comes into touch with a contact 65′ of the microswitch 65 thereby to cause the motor 46 to stop. By such arrangement the plate 7 can be stopped accurately at the desired position.

In Fig. 6 illustrating a still further embodiment of the invention, a nut member 66 is fixed to the shiftable plate 7 and adapted to engage with the helical screw 24. As compared with the apparatus shown in Fig. 5, only difference lies in the device for changing the rotation speed of the helical screw 24. In this device, a shaft 68 of the motor 67 is provided with a gear wheel 69 which rotates a shaft 71 through a gear wheel 70. A gear wheel 72 is fixed on the shaft 71. A pulley 74 is provided integrally with a portion 73′ of the clutch 73, 73′. The pulley 74 is rotatably supported on a shaft 75 of the helical screw 24. A gear wheel 76 and the clutch 73 are formed in a body slidable on the shaft 75 and adapted to rotate the shaft 75 through a key 77. The electromagnet 78 when electrically connected is adapted to turn a shaft 79 up to some angles thereby to move a lever 81 through a cam 80. By the movement of the lever 81 about the fulcrum 82, the body comprising the wheel 76 and the clutch 73 is moved rightwards or leftwards. When the electromagnet 78 is not electrified and the body 73, 76 is situated at the rightside end, the motor 67 drives a pulley 83 and a belt 84 thereby to rotate the pulley 74, the clutch 73, 73′ and the wheel 76. Hence, the helical screw 24 revolves at high speed by the action of a key hole of the body 73, 76 together with the key 77 fixed on the shaft 75, so that the plate 7 can be shifted at high speed from the left to the right.

The microswitch 63 comes to work in like manner as in Fig. 5 and the electromagnet 78 is electrically connected whereby the body 73, 76 is moved by the lever 81, releasing the portion 73 from the engagement with the other portion 73′ and bringing the wheel 76 into gear with the wheel 72. Thus, the helical screw 24 is subjected to the low speed rotation through the worm gearing 69, 70 and consequently the turn table moves at low speed. When the center of the turn table reaches the desired position, the microswitch 65 acts to stop the motor 67 so that the starting position of the turn table can be accurately fixed.

It is noted that high rotary motion will be obtained if a small sized electromagnet as shown in Fig. 7 is used for the electromagnet 54 or 78.

Fig. 7 illustrates details of the electromagnet as seen from above, in which two coils 86, 87 are shown in the form of being taken out of the magnet 85 for the convenience of explanation. An insulation 89 provided with a metal contactor 90 is integrally fixed on a rotary shaft 88 of the electromagnet. Contacts 91, 92, 93 are fitted on the magnet 85 and insulated from each other. Under the conditions as shown, the contacts 91, 90, 92 are connected each other to short-circuit the coil 87. When the input side 94 of the coil is electrically contacted, a large rush current flows in the coil 86 to produce a large torque required to overcome the load of the shaft 88 and cause the shaft 88 to revolve smoothly in the direction of the arrow 95. With the revolution of the shaft 88, the contactor 90 moves off the contact 91 and short-circuits the contact 93 whereby the revolution is stopped and the current flows in the coil 87. As the current of the coil 87 is much less than that of the coil 86, there is advantage of maintaining the continuous working of the electromagnet. From the above, it will be appreciated that the small-sized electromagnet generating a little heat comes to work with considerably large starting torque and thereafter the working condition can be satisfactorily maintained with less current.

As described above, the invention discloses that the turn table of the magnetic sound recording and reading machine can be returned to the required position first with a considerably high speed and then with a reduced speed when it is about to reach said position, thereby to eliminate defects caused by inertia of the turn table and to stop the turn table automatically in the accurate position, so that the head runs precisely on the sound recording track to produce good reproduction.

The mechanism for driving the turn table of the magnetic sound recording and reading machine will be now described.

It is required often to repeat the stop and restarting of the motor when in the course of the recording or reproduction the working is stopped and after a short while started again.

Hitherto the rotation of the turn table has been effected by one motor separately from that for shifting said table. Such use of two motors has disadvantage that due to the structural difference or the variation of load conditions between the two motors the turn table cannot be stopped or started instantly even when the two motors are electrified simultaneously in order to stop or restart the rotation and shift of the turn table. If the rotation and shift of the turn table is stopped or started by respective motors, it is certain that there occurs a time lag, that is, it is almost impossible to expect the stop or starting of rotation and shift of the turn table at the same time. Consequently, the recording or reproduction cannot be carried out satisfactorily.

The invention removes such disadvantages by the provision of a single driving system for starting or stopping the rotation and shift of the turn table.

Fig. 8 illustrates the magnetic sound recording sheet as shown in Figs. 1 and 4, in which 1 is a paper, 2 a magnetic sound recording film coated on the paper between parallel lines X, Y, and 2′, 2″ holes for setting the sheet S on the magnetic sound recording and reading machine. Assuming that the ordinary machine using two motors for driving the turn table carries out the sound recording in the direction of the arrow 4′ to produce tracks $u_1$, $u_2$, the recording of the track $u_2$ started from A′ would be stopped at P″ and restarted therefrom, even when the switch for the motors were off at P′ and at the same time the movement of the turn table were ceased. This divergence is due to the rotation of the turn table caused by its inertia. Also in reproduction, the scanning head of the track $u_2$ would pass P' and thereafter on a track $u_{2'}$ indicated with a dotted line which is deviated from the actual track. Thus, the reproduction on this part becomes defective or impossible if the deviation is excessive.

Such difficulties due to the discontinuity of track caused by interruption of the scanning may occur in the course of the recording or reproduction, or in the start or stop thereof. Similar difficulties may be brought about even on the sheet having sound recording tracks of perfectly continuous arc.

Further, take the case in Fig. 8. The sound recording tracks $t_1$, $t_2$ would be produced in the direction of the arrow 4. After the track $t_1$ is produced, the track $t_2$ is interrupted at P. If at this time the rotation and the shift of the turn table are simultaneously ceased, the track $t_2$ started from A stops exactly at P. If the rotation and the shift are restarted at the same moment to continue the sound recording, the track started from P is ended at B. This track $t_2$ composed AP and PB is a perfect arc, so that the recording can be effected as desired. In this case the inertia, if any, at the time of stop has no effect on the track as it affects equally the movements of rotation and shift.

Figures 9, 11, 12:
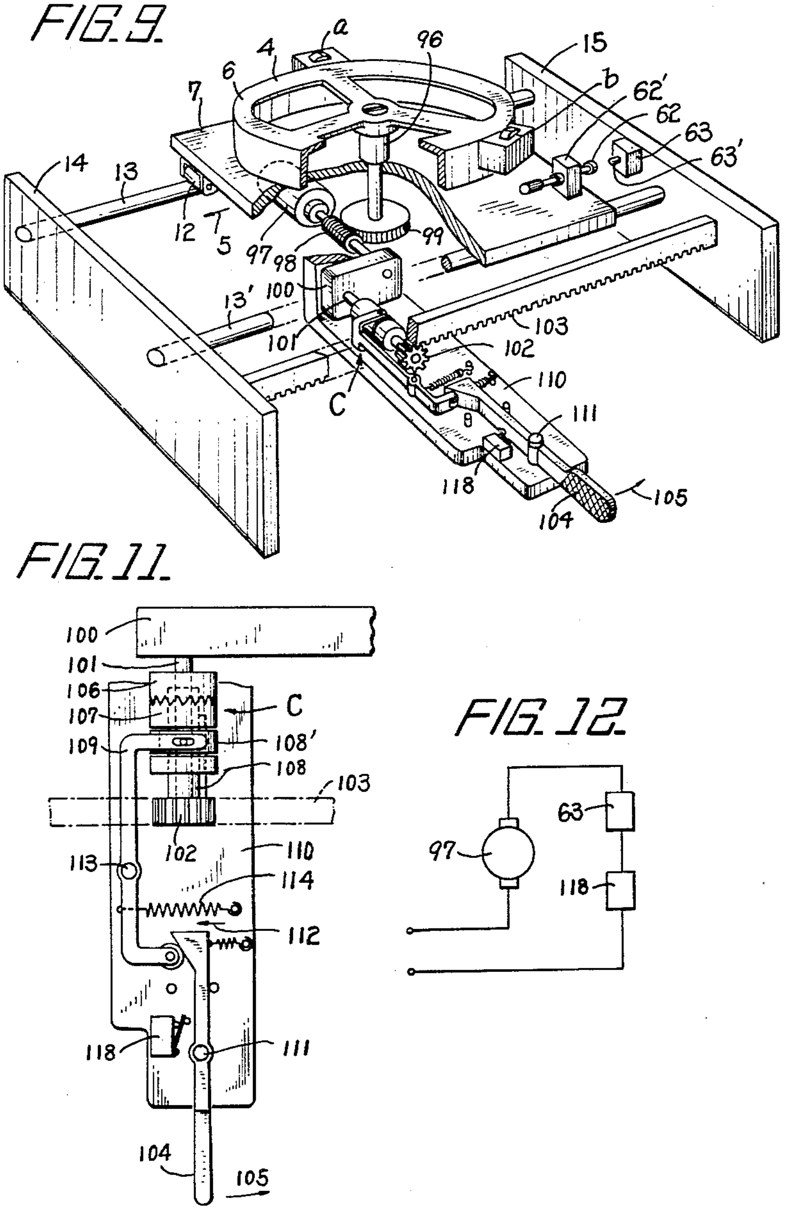
Fig. 9 is a perspective view of the details, partly broken away, of the magnetic sound recording and reading machine showing the means for the return of the head-supporting body.
Fig. 12 shows one example of the wiring connected to a motor.

Fig. 9 illustrates a further embodiment of the inveniton which is suitable to perform the functions which have been just described. In Fig. 9, the turn table has a plurality of recording or reproducing heads *a*, *b*, *c* (three in the drawing but *c* not shown) which are fixed on the circumference apart from one another by an equal distance. This turn table is adapted to rotate on the shiftable plate 7 which is provided with a bearing (not shown) for the driving shaft 96 of the turn table. Rolls 12 (one roll is shown) fitted to the turn table slide on guide rails 13, 13' supported by the end plates 14, 15. The motor 97 drives the turn table 6 in the direction of the arrow 4 by way of a gearing 98, 99 and the shaft 96. Through a reduction gear 100 and a shaft 101, the motor 97 also drives a pinion 102 in engagement with a rack 103. Both ends of the rack 103 are fixed on the end plates 14, 15. Since the reduction gear 100 and the motor 97 are fitted to the shiftable plate 7, if the motor is in motion, the plate 7 can move in the direction of the arrow 5 with constant speed under action of the rack and pinion 103, 102. The motor 97 electrified drives the turn table 6 and the plate 7 in respective directions of the arrows 4, 5 while the heads *a*, *b*, *c* charged with sound current carry out the recording. In the course of recording the motor can be stopped and restarted without causing disadvantages already described, since the movement of the turn table and that of the plate 7 are effected by one and the same driving system, i.e. a single motor-shaft so that both movements are instantly stopped or started in their interrelationship, free from the inertia of the motor and others. Thus, the invention provides a mechanism by which the head-scanning locus can be accurately maintained even when the motor is stopped and started again in the course of the recording or reproduction.

A still further object of the invention will be clarified in the following description.

As shown in Fig. 1 or 4, the magnetic sound recording sheet S is moved at a constant speed in the direction of the arrow 5 and at the same time the turn table having the heads *a*, *b*, *c*, provided equidistantly is rotated in the direction of the arrow 4. Started from P, the track $n_1$ is produced in the direction of the arrow 4. The center of the turn table is positioned at O when the recording is started. After the consecutive formation of tracks $n_1$, $n_2$ . . . , the center of the turn table must be brought back exactly to the very point O if the reproduction of these sound tracks is carried out.

The gap length of the head is usually 0.7 to 0.9 mm. In the case of the gap length being 0.9 mm., it is necessary to bring back the center of the turn table to the starting point O with the accuracy of 0.045 mm. in order to get the width of the track and that of the head overlapped each other. The unsatisfactory overlapping has disadvantages that sound output is decreased; hearing becomes impossible due to deviation from the track, and the scanning is made on a wrong track, for instance, the head which ought to scan the track $n_1$ runs on the track $n_2$.

The invention eliminates such defects and provides a mechanism for accurately returning the turn table to its exact center O after completion of the recording or reproduction and then for scanning the right track e.g. $n_1$ in Figs. 1 or 4.

Fig. 9 illustrates the mechanism for driving the turn table as one example of attaining the object just described.

In Fig. 9 the frame for setting the magnetic sound recording sheet on the machine and the transparent pressing plate are omitted. The movement of the turn table 6 and the shiftable plate 7 has been described in full. As shown in Fig. 1, the turn table 6 has been moved in the direction of the arrow 5 for recording. In reproduction, the turn table must be returned to the starting position. For this end, a grip 104 is pulled in the direction of the arrow 105 but the turn table 7 is not moved thereby because of the engagement of the pinion 102 with the rack 103. Now, the clutch C comprising two members 106, 107 is provided on the apparatus between the shaft 101 and the pinion 102 as shown in detail in Fig. 11. The member 106 is fixed integrally with the shaft 101 while the member 107 is associated with the key of the shaft 108 of the pinion 102 and adapted to slide in axial direction in such a manner that the member 107 is adapted to slide a little distance on the shaft 108 while the shaft 108 is adapted to rotate with the member 107. A collar 108' is loosely fitted in a groove provided on the member 107 and a pin fixed on the collar 108' is fitted in a lever 109 so that if the collar 108' is moved upwardly by the lever 109, the member 106 comes into gear with the member 107 thereby to transmit the rotation of the shaft 101 to the pinion 102, and if the collar 108' is moved downwardly, the member 106 is released and its rotation does not affect the pinion 102.

To perform the connection or disconnection of the clutch C, the lever 109 is operated in the following manner. The grip 104 is fixed by a pivot 111 to the metal fittings 110 connected to the plate 7. When the grip 104 is pushed in the direction of the arrow 105, the other end of the grip 104 is turned on the pivot 111 in the direction of the arrow 112. The lever 109 is then turned about the fulcrum 113 and moves the collar 108' downwards, thereby disconnecting the clutch 106, 107. When the grip 104 is set free, it returns to its place by the action of a spring 114 and at the same time the lever 109 moves the collar 108' upwards, thereby connecting the clutch 106, 107, so that the rotation of the shaft 101 is transmitted to the pinion 102.

In Fig. 9, the contact 62 adjustably fixed through a member 62' on the shiftable plate 7 is adapted to push a contact 63' of the microswitch 63. These contacts are the same in structure and function as in Figs. 5 and 6. As shown in Fig. 10, the microswitch 63 is fixed on the end plate 15 or other fixed part. Within the microswitch there is provided a trifurcated member 116 having a movable contact 115, said member comprising a piece 117 with which the contact 63' is connected, and other two resilient pieces.

After the recording is effected, the grip 104 is pushed in the direction of the arrow 105 (Fig. 9), whereby the clutch C is disconnected and the plate 7 is moved rightwards. At the time when the clutch C is out of engagement, the pinion 102 can be moved very easily along the rack 103. It might be thought that instead of the clutch C, the pinion is so arranged as to be out of engagement with the rack at the time of the return motion of the shiftable plate 7 and to come into engagement with the rack when the plate 7 is returned to its place. It is however inexpedient to provide such arrangement, since precision in the engagement of the rack and pinion is requisite for the magnetic sound recording and reading machine and, if engagement and disengagement of the rack and pinion are repeated a thousand times, the gear tooth is liable to damage. According to the invention the rack is at all times in engagement with the pinion, so that their life is very long and almost no trouble occurs.

When the shiftable plate 7 is brought back to the right by the grip 104, the contact 62 of the plate 7 pushes the contact 63' of the microswitch 63 to make the movable contact 115 touch with the fixed contact 117, thereby electrifying the motor 97. Thereupon the motor 97 rotates the pinion 102 to move the plate 7 in the direction of the recording or reproduction. By the movement of the plate 7 the pressure of contact 62 upon contact 63' is released and the resilient piece of the member 116 acts to separate the contacts 115, 117 whereby the motor 97 is ceased to rotate and the plate 7 is stopped accurately at the starting position of the recording or reproduction of the sheet.

The mechanism for operating the movement of the shiftable plate by action of the rack and pinion has been described. Similar operation can be effected by an arrangement which comprises a helical screw used in place of the rack and pinion, a nut to engage with said helical screw being provided on the shiftable plate, and a transmission gearing such as the clutch C being provided in the system for rotataing said helical screw.

As is clear from the description of the invention, the shiftable plate is placed by hand into a position beyond the starting point and then moved by the rotation of the motor. After the shiftable plate is thus moved up to a certain position in the direction of the recording or reproduction, the motor is automatically switched-off and the starting point of the recording or reproduction is precisely settled. Thus, the movement in the direction of the recording or reproduction is free from mechanical errors which may be otherwise inevitably made by the engagement of the rack and pinion or the play of the clutch, so that in the sound recording or reproduction the starting position can be easily yet precisely settled and any tracking error never occurs even when the head of a very narrow width scans the track. A switch 118 operated by the grip 104 is adapted to electrically connect with the motor 97 when the clutch C is in engagement, and to be off when the clutch C is out of engagement by pushing the grip 104, so that with the return of the shiftable plate to the starting position, the switch 118 is automatically off. Also while the grip 104 is pushed, the switch 118 is kept off even when the contact 62 touches the contact 63'. The motor is set in motion immediately when the grip 104 is released. Therefore, undue influence is never exerted upon the engagement of the rack and pinion by the relationship between manual operation and motor. As shown in Fig. 12, the microswitch 63 and the switch 118 are arranged in series with the motor 97.

The embodiments of the invention have been described in conjunction with the magnetic sound recording and reading machine capable of recording or reproducing the sound, but they are also applicable to a sound recording apparatus of the type which works to only record the sound.

What is claimed is:

1. An apparatus for magnetic sound recording and reproducing comprising a panel plate having a wide window and adapted for accommodating in a determinable position a magnetic sound record sheet having a visible description on one surface, a plate mounted below the panel plate and shiftable in longitudinal direction, a turntable rotatably mounted on said shiftable plate and having a plurality of magnetic sound recording and reproducing heads mounted on its periphery and spaced at a distance equal to the width of the magnetic coating film of the magnetic sound record sheet, a transparent pressing plate adapted to be placed on the magnetic sound record sheet with the latter on the panel plate, and a device for rotating the turntable and shifting the shiftable plate in longitudinal direction whereby sound transducing of the magnetic coating film of the sheet is effected by the sound recording and reproducing heads of the turntable, the device for rotating the turntable and shifting the shiftable table comprising a motor, a gear means connecting the motor to the turntable, and another gear means connecting the motor to the shiftable table, and a further device for returning the shiftable plate and one of the sound recording and reproducing heads to a starting position after completion of a transducing operation.

2. Apparatus according to claim 1, wherein the gear means connecting the motor to the turntable comprises an idle wheel and a wheel which is driven by the motor and drives the turntable through said idle wheel which contacts the inside of the turntable; the gear means connecting the motor to the shiftable plate comprising a worm wheel fixed in longitudinal direction in relation to the shiftable plate and a screw rod rotatably supporting said worm wheel and arranged so that the shiftable plate is advanced when the worm wheel is rotated by the motor; the device for returning the shiftable plate and said one of the sound recording and reproducing heads to the starting position comprising another motor which rotates the screw rod to drive the worm wheel and an electro-magnet to pull the idle wheel out of contact with the turntable and another idle wheel brought by said electro-magnet into contact with the turntable to turn said table until the later said idle wheel comes into engagement with a groove provided on the turntable to stop the rotation of the turntable and to place one of the heads of the turntable at an edge of the magnetic coating film.

3. An apparatus according to claim 2, comprising two switches and contacts operatively associated with the slidable plate, the first contact operating one switch when the shiftable plate is returned to the starting position to slow down the speed of returning the shiftable table, the second contact operating the other switch to stop the motion when the shiftable plate is at the starting position.

4. An apparatus according to claim 3, wherein the change of the speed of the returning shiftable plate is effected by a reduction gear system under the control of an electro-magnet operated by the switch operated by the first contact of the shiftable plate.

5. An apparatus according to claim 3, wherein the change of the speed of the returning shiftable plate is effected by a clutch means under the control of an electro-magnet operated by the switch operated by the first contact of the shiftable plate.

6. An apparatus according to claim 2, wherein the gear means connecting the motor to the turntable comprises a wheel which is driven by the motor and drives the turntable; another gear means connecting the motor to the shiftable plate comprising a pinion rotatably mounted on the shiftable table and driven by the motor and in engagement with a fixed rack longitudinally disposed so that shiftable plate is advanced when the pinion is rotated by the motor; the device for returning the shiftable plate to the starting position including a handle attached to the shiftable plate, said device including a clutch system for disengaging the pinion and the motor.

References Cited in the file of this patent

UNITED STATES PATENTS 2,479,640 Rieber ---------------- Aug. 23, 1949